2,820,057

KETENE REACTIONS

Arthur W. Schnizer, Corpus Christi, Tex., assignor to Celanese Corporation of America, New York, N. Y., a corporation of Delaware No Drawing. Application April 1, 1955
Serial No. 498,758

4 Claims. (Cl. 260—544)

This invention relates to reactions of ketene and relates more particularly to reactions of ketene with interhalogens.

It is an object of this invention to provide a novel process for the production of compounds of the formula X—$CH_2$CO—Z, where X and Z are halogens, X having a higher atomic number than Z.

Another object of this invention is the provision of a new process for the production of iodoacetyl chloride by the reaction of ketene and iodine monochloride.

It is a further object of this invention to provide a new process for the production of iodoacetic acid.

Other objects of this invention will be apparent from the following detailed description and claims.

In accordance with this invention ketene is reacted with an interhalogen compound, such as iodine monochloride, to produce a haloacetic acid halide wherein the halo atom is of higher atomic weight than the halide atom. Preferably, the reaction is carried out in the liquid phase by the reactants in solution in a solvent which is substantially inert under the reaction conditions, such as carbon tetrachloride or other chlorinated hydrocarbon, carbon disulfide, or ether. The crude reaction product obtained by the reaction between the ketene and the interhalogen may also be used as the solvent. In one convenient process the ketene is passed continuously into a solution of iodine monochloride in carbon tetrachloride. Alternatively, a vapor phase reaction may be employed, particularly when a more volatile interhalogen compound, such as iodine monobromide, chlorine monofluoride, bromine monochloride or bromine monfluoride is used. Optimum results have been obtained when the reaction temperature has been relatively low, e. g. not above about 50° C., preferably in the range of about —50° C. to +50° C. It is advantageous to use equimolar proportions of the ketene and the interhalogen compound, but other ratios may be used.

The haloacetic acid halide produced by the process of this invention may be subsequently hydrolised, with or without an added acidic or basic catalyst, to the corresponding haloacetic acid.

Iodoacetyl chloride can be used to introduce the iodoacetate function into biologically active compounds such as sterols or alkaloids. Iodoacetic acid is a strong muscle poison with its action based on enzyme inhibition. It has been found to inhibit plant growth, to function as a highly effective contact insecticide for DDT-resistant flies, and to act as an efficient defoliant for cotton, beans or potatoes.

In order to further illustrate this invention, but without being limited thereto, the following example is given. All proportions are by weight unless otherwise indicated.

Example

Over a period of one hour, 44 parts of gaseous ketene are passed at a constant rate into a solution of 84 parts of iodine monochloride (ICl) in 115 parts of carbon tetrachloride. The reaction mixture is stirred throughout the addition of the ketene and is maintained at a temperature of —10 to —15° C. The resulting mixture is then distilled under subatmospheric pressures low enough to keep its temperature below 50° C. There is obtained a fraction boiling at 30° C. at 3.4 mm. Hg absolute and consisting essentially of iodoacetylchloride.

Water is added to the iodoacetyl chloride thus produced until no further exothermic reaction is observed. Some color is present and this is discharged by the addition of a few drops of 0.1 N sodium thiosulfate solution. On chilling the solution, iodoacetic acid precipitates in colorless plates melting at 74–79° C. without further purification.

It is to be understood that the foregoing detailed description is merely given by way of illustration and that many variations may be made therein without departing from the spirit of my invention.

Having described my invention, what I desire to secure by Letters Patent is:

1. Process for the production of iodoacetyl chloride which comprises reacting ketene with iodine monochloride.

2. Process for the production of iodoacetyl chloride which comprises reacting ketene with iodine monochloride in solution in an inert solvent.

3. Process for the production of iodoacetyl chloride which comprises reacting ketene with iodine monochloride in solution in an inert solvent at a temperature of —50° C. to +50° C.

4. Process for the production of iodoacetyl chloride which comprises introducing gaseous ketene into a solution of iodine monochloride in carbon tetrachloride at a temperature of —50° C. to +50° C.

References Cited in the file of this patent

UNITED STATES PATENTS 2,697,115   Clower et al. _____ Dec. 14, 1954

OTHER REFERENCES

Abderhalden et al.: C. A., vol. 2, 1908, p. 3362.
Whitmore: Organic Chemistry, 2nd ed., 1951, pp. 37, 38.